May 13, 1941.  R. L. SCHOENE  2,241,743
ELECTRO-OPTICAL INSTRUMENT
Filed Aug. 3, 1940
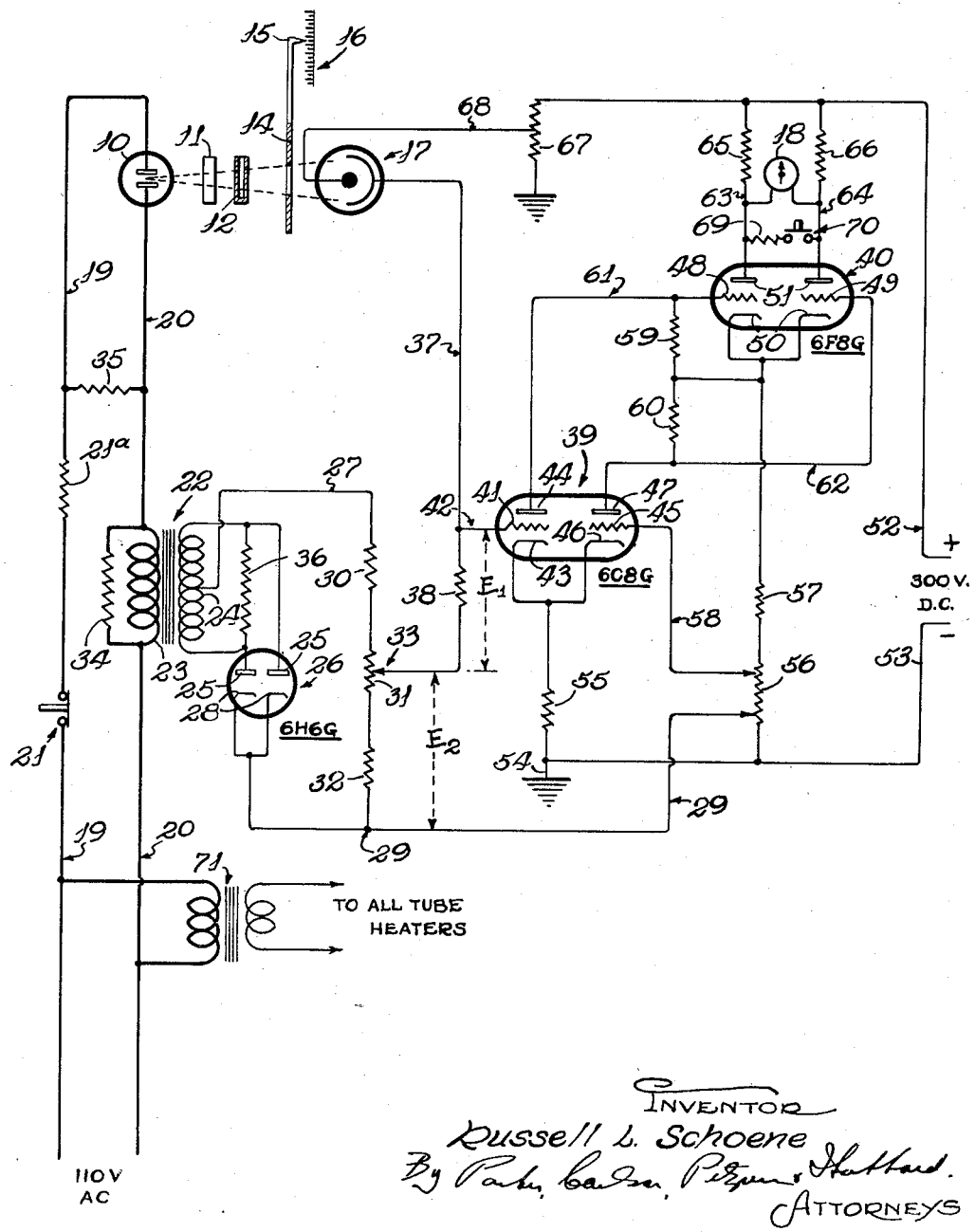

Patented May 13, 1941

2,241,743

UNITED STATES PATENT OFFICE 2,241,743

ELECTRO-OPTICAL INSTRUMENT

Russell L. Schoene, Evansville, Ind.

Application August 3, 1940, Serial No. 350,844

6 Claims. (Cl. 250—41.5)

The invention relates to improvements in electro-optical instruments and has particular, though by no means exclusive, utility as applied to absorption type photometers.

Absorption photometers are used for determining the ratio of absorption of either visible or invisible light by a sample material as compared to some standard material. Such a ratio of light absorption may be used, for example, as an index of the vitamin concentration in a solution. In general, an instrument of the character indicated embodies in its optical system a source of light and a light sensitive device such as a phototube for receiving light passed through a sample of material being tested. By comparing the amount of light received by the phototube when the light is passed through some standard material with that passed through a sample being assayed an index of their relative light absorption quality is obtained. It is obvious that the precision of such an instrument is dependent directly upon the constancy of light emission from the source of light. Unfortunately, the light emission of most light sources varies. For example, the light given off by various electric lamps varies with the voltage applied to them and with many other factors. On the other hand, most sources of electric current, such as an ordinary lighting system, vary in voltage and even if an elaborate and expensive arrangement is provided for supplying a precisely controlled voltage to the lamp the light emission will vary from other causes, such as temperature changes in the lamp. Heretofore, various proposals have been made for compensating for variations in light emission in such instruments. These arrangements have, however, usually entailed the use of split-beam optical systems, an additional phototube, and other expensive items of apparatus.

The general aim of the present invention is to provide an electro-optical instrument such, for example, as an absorption photometer, embodying an improved and simplified arrangement for automatically compensating at all times for variations in the amount of light emitted by the instrument's light source.

In carrying out the invention advantage has been taken of the fact that the current drawn by an inert gas glow lamp bears a substantially constant ratio to the lamp's light emission. Such a lamp is used as a light source in the photometer herein shown and variations in lamp current are utilized in the circuits of the instrument to compensate automatically for variations which occur in the amount of light emitted from the lamp. Consequently, the instrument can be operated from an ordinary lighting circuit or other comparatively unregulated voltage source while retaining a high degree of precision and accuracy in the results obtained from the instrument.

Further objects and advantages of the invention will become apparent as the following description proceeds, taken in connection with the accompanying drawing in which the single figure is a schematic wiring diagram of an absorption photometer embodying the invention.

The invention has been exemplified herein as embodied in an absorption photometer such as is used in determining the vitamin concentration of various solutions by comparing their light absorption characteristics with those of a standard solution or series of standard solutions. It should be understood, however, that instruments embodying the present invention are capable of a wide variety of other uses, and further, that various modifications may be made in the instrument to accommodate it for particular installations such, for example, as operation from a direct current rather than from an alternating current source. Consequently, even though a particular embodiment of the invention has been shown and described in some detail, there is no intention to thereby limit the invention to such embodiment, but, on the other hand, the appended claims are intended to cover all modifications and alternative constructions falling within the spirit and scope of the invention.

In the illustrative construction the optical system of the instrument includes a light source or lamp 10, a suitable light filter 11, a sample cell 12 for the light absorbing material to be tested, a variable-aperture diaphragm 14 articulated with a pointer 15 cooperating with a graduated scale 16 to indicate the size of aperture for which the diaphragm is adjusted, and a light sensitive device in the form of a phototube 17. Suitable condensing lenses and the like (not shown) may be provided as required. Also included in the instrument is a visual indicator, shown in the form of a galvanometer 18, and actuated by the phototube 17 in a manner which will hereinafter appear.

In brief, a series of standard materials are placed in the cell 12 and in each instance the opening of the diaphragm 14 is adjusted until the same reading, which may, for example, be zero, is obtained on the galvanometer 18. The readings on the scale 16 for the diaphragm aperture are in each instance recorded. Then an unknown sample of material is placed in the cell 12 and the aperture of the diaphragm 14 adjusted until the galvanometer again reads zero. The operator has then only to read the setting of the diaphragm registered on the scale 16 and to compare this figure with the previously plotted calibration arrived at by the use of the standard materials to determine the light absorbing capacity of the unknown sample.

In accordance with one aspect of the present invention a lamp is used as the light source 10 which has the characteristic that the amount of current which it draws is substantially directly proportional to the quantity of light which it emits, throughout the working range of the instrument. For this purpose the lamp 10 may be a gas conduction lamp or inert gas glow lamp filled, for example, with argon. It is characteristic of such gas conduction lamps that their light intensity varies nearly, but not quite, in direct proportion to the lamp current. In a manner hereinafter explained, the constants of the circuit associated with the lamp are so proportioned that a direct current potential is produced which varies exactly and directly with changes in the intensity of light emitted from the lamp whether the changes in intensity be due to line voltage variation or to changes in the lamp itself, such as temperature, gas pressure, glow area, etc. Additionally, the use of an inert gas glow lamp is advantageous in the present instrument in that it provides a source of light fairly rich in ultra-violet rays. The ratio of the absorption of such short wavelength light has been found to constitute a good measure of the vitamin concentration in various solutions. The filter 11 is arranged so that it will pass only light falling within a definite band of wavelengths, in this case, light within the so-called ultra-violet range.

In accordance with another and important aspect of the invention, means is provided to utilize variations in current drawn by the glow lamp 10 to compensate automatically for variations in light intensity of the lamp. In view of the fact that the lamp current and light emission are proportional, the variations in current give an accurate index of variations in light emission and, accordingly, can be used to operate the compensating arrangement. In the present instance, the glow lamp 10 is energized from a supply circuit including conductors 19 and 20 connected to its respective terminals and to a suitable source of current. The latter may, for example, be an ordinary 110 volt alternating current electric lighting system. A normally closed push button switch 21, interposed in the conductor 19, controls the supply of current to the lamp 10. A series resistor 21a is also provided in the supply circuit.

To obtain a direct current potential proportional to the alternating current passing through the glow lamp 10 an auxiliary circuit is provided including a current transformer 22. This transformer includes a primary winding 23, interposed in the conductor 20 in series with the glow lamp 10, and an inductively coupled secondary winding 24. The opposite end terminals of this secondary winding are connected to the anodes or plates 25 of a twin diode rectifier tube 26, which may be a type 6H6G tube. A center tap on the transformer secondary is connected to one output lead 27 of the rectifier network and the cathodes 28 of the rectifier tube are connected to the other output lead 29. This rectifier network feeds a voltage divider comprising three resistor sections 30, 31 and 32 with the usual adjustable contact 33. Consequently, the direct current voltage drop $E_2$, developed across the portion of the voltage divider indicated, is proportional to the current drawn by the glow lamp 10.

With the arrangement so far described the voltage $E_2$ will be substantially proportional to the light emitted by the lamp 10. For a high degree of precision, however, it is desirable to modify the constants of the circuit somewhat in order that the relationship of the voltage $E_2$ to light intensity shall be exact over the entire working range of the circuit. For this purpose resistors 34 and 35 are connected respectively in shunt with the transformer primary winding 23 and the lamp 10 while a third resistor 36 is connected in shunt with the transformer secondary winding 24. By adjusting the values of these resistors and the total value of the load resistances 30—31—32 in the rectifier network the desired relationship of output potential to light intensity of the lamp can be obtained. The exact values of resistance used depend upon the constants of the lamp 10 and the transformer 22.

One terminal of the phototube 17 is connected through an output lead 37 and a load resistor 38 with the adjustable contact 33 of the voltage divider. Consequently, the voltage drop $E_1$ across the phototube load resistor 38 is directly proportional to the current from the phototube 17 and, consequently, to the light received by the phototube. Instead of using variations in this voltage $E_1$ alone to actuate the indicator 18, however, the circuits are so arranged that the potentials $E_1$ and $E_2$ are in voltage opposition. As a result, the algebraic sum of the two constitutes a measure of the light falling on the phototube with an automatic compensation or correction for variations in the light emitted from the source 10. This algebraic sum of the potentials $E_1$ and $E_2$ is, therefore, used to actuate the indicator.

In view of the low energy available from the phototube 17 an amplifier is preferably interposed between the indicator or galvanometer 18 and the combined output from the phototube 17 and the rectifier network. The amplifier circuit illustrated is designed to minimize the effect of the drift characteristic common to all direct current amplifiers, so as to give maximum accuracy of operation for the instrument.

The amplifier arrangement shown includes two duplex triode amplifier vacuum tubes 39 and 40, which may be respectively, type 6C8G and 6F8G tubes. The first triode group in the tube 39 includes a control grid 41 connected to an output conductor 42 from the potential network. The algebraic sum of the potentials $E_1$ and $E_2$ is applied to the control grid 41 through this conductor 42 so that this biasing potential on the control grid regulates the flow of current between the cathode 43 and anode 44. The second triode group in the tube 39 includes a grid 45, cathode 46 and anode 47. Similarly, the other amplifier tube 40 includes two control grids 48 and 49, cathodes 50 and anodes 51.

Plate voltage is supplied for the amplifier circuit from a suitable high voltage source of direct current through conductors 52 and 53. The conductor 53 is grounded at 54 and is connected to the cathodes 43 and 46 of the first amplifier tube 39 through a resistance 55. Similarly, this same conductor is connected to the cathodes 50 of the second amplifier tube 40 through resistances 56 and 57, the output lead 29 of the rectifier network being interconnected with the amplifier network through the resistor 56. This resistor 56 also biases the second control grid 45 of the amplifier tube 39 with respect to its cathode 46, being connected to this grid through a conductor 58. Biasing resistors 59 and 60 are connected between the control grids 48 and 49 and cathodes 50 of the second amplifier tube 40. The plate leads 61 and 62 from the first amplifier tube 39 are connected to the grids 48 and 49 of the second amplifier tube 40. The plate leads 63 and 64 from this second amplifier tube are connected through resistors 65 and 66 respectively with the plate supply line 52. This latter supply line is connected to ground through a voltage divider resistor 67 in which a conductor 68 is tapped and connected to the phototube 17 to apply a proper voltage to it.

The galvanometer 18 is connected across the output leads 63 and 64 of the second amplifier tube 40 and is, accordingly, energized in response to variations in the algebraic sum of the input potentials $E_1$ and $E_2$. To protect the galvanometer 18 from damage due to sudden surges during switching and the like the usual shunting resistor 69 is arranged to be connected across it by safety push button 70.

All of the vacuum tubes 26, 39 and 40 are of the indirectly heated cathode type. Their cathode heaters (not shown) are supplied with current in the usual manner from a filament heater transformer 71 connected across the alternating current supply lines 19, 20.

In the operation of the photometer described it may, for example be used to measure the vitamin concentration of various solutions in which this concentration is proportional to the absorption of ultra-violet light by the solution. In such case the following procedure is followed. Current is turned on for the instrument and the tubes are permitted to warm up for about fifteen minutes. The push button 21 is opened to extinguish the lamp 19 and, with the lamp extinguished, the setting of the variable resistor 56 is changed until the galvanometer 18 reads zero or some other selected reference value. Next the diaphragm 15 is set for its smallest opening (zero reading on the scale 16) and the sample cell 12 filled with a solution of zero vitamin concentration. The push button 21 is closed to light the lamp 10 and the voltage divider contact 33 is adjusted until the galvanometer again reads zero (or the other selected reference value on the galvanometer scale) thus indicating that the potentials $E_1$ and $E_2$ are exactly balanced. During the adjustment of the voltage divider the push button 21 is alternately pushed and released, the galvanometer 18 being observed for any deflection upon such opening and closing of the circuit. Because of drift in the amplifier circuit the needle of the galvanometer may gradually shift from its zero or other reference position but that is not important. The condition of balance is indicated by the lack of deflection when the push button 21 is alternately opened and closed rather than by any absolute position of the galvanometer needle.

Having thus preliminarily standardized the settings of the elements of the instrument the operator next proceeds to calibrate it. For this purpose the cell 12 is successively filled with one after another of a series of different solutions, each of a known vitamin concentration different from the others. In the case of each solution, the cell 12 is put in place and the diaphragm 14 adjusted until the galvanometer 18 again shows no deflection when the switch 21 is alternately opened and closed. The readings on the scale 16 are recorded for each of the series of solutions of known vitamin concentration.

Having obtained these preliminary data for calibration of the scale 16 the photometer may be used to determine the vitamin concentration of various samples of solutions whose vitamin concentration is unknown. To this end the solution to be assayed is placed in the sample cell 12 and the push button 21 is alternately opened and closed just as in the case of the calibration operation described. Furthermore, the aperture diaphragm 14 is adjusted until the galvanometer 18 shows no deflection as a result of the opening and closing of the push button 21. When this condition of no-deflection has been reached the reading on the scale 16 is observed. From this latter reading the operator can determine from the previous calibration obtained with the standard solutions what the vitamin content of the unknown sample is. In the course of this operation any variations in light intensity from the glow lamp 10 are automatically compensated as previously described. In this way uniform accuracy for the instrument is maintained despite any variations in the alternating current supply voltage or changes in temperature, etc., in the glow lamp.

I claim as my invention:

1. An absorption photometer comprising, in combination, an electric lamp having a light emission characteristic substantially directly proportional to its current consumption, a supply circuit for the lamp, light sensitive means for producing an electrical potential proportional to the light passing from said lamp through a sample whose light absorption is being tested, an indicator, means for actuating said indicator in response to variations in the potential produced by said light sensitive means, means for producing an electrical potential proportional to the current in said lamp supply circuit, and means for utilizing the potential produced by said last named means to oppose the potential produced by said light sensitive means and thereby correct the actuation of said indicator to compensate for variations in the amount of light emitted from said lamp.

2. In an electro-optical instrument the combination of a phototube, said tube having an output circuit, an electrical indicator device operated from said output circuit, a gaseous-discharge type glow lamp having an electric supply circuit and arranged to furnish light to the phototube, and means actuated in response to variations in the flow of current in said glow lamp supply circuit for modifying the actuation of said indicator to compensate automatically for variations in the light emission of said glow lamp.

3. In an electro-optical instrument the combination of a phototube, said tube having an output circuit, an electric lamp having a light emission characteristic substantially directly proportional to its current consumption, said lamp having an electric supply circuit and being arranged to furnish light to the phototube, an electrical indicator device, means for actuating said indicator in response to variations in the potential developed in said phototube output circuit, and means responsive to variations in current in the lamp supply circuit for modifying the potential developed in said phototube output circuit to correct for variations in the intensity of light emitted from said lamp.

4. In an absorption photometer the combination with a phototube adapted to be actuated by light passed through a sample being tested, of an inert gas glow lamp arranged to constitute a source of light applied to the sample, and means responsive to variations in the current passed through said lamp for automatically compensating for variations in the light emission of said lamp.

5. An electro-optical instrument comprising, in combination, a gas conduction lamp arranged to form a light source for the instrument and having an electric supply circuit, an output circuit in the instrument, means including a phototube for applying to said output circuit an electrical potential proportional to the light passing from said lamp to said phototube, means for applying to said output circuit a second potential proportional to the current flowing in said lamp supply circuit and in voltage opposition to the potential applied by said first named means, and means including an indicator for indicating variations in the algebraic sum of the two opposed potentials.

6. An electro-optical instrument comprising, in combination, a gas conduction lamp arranged to form a light source for the instrument and having an electric supply circuit, an output circuit in the instrument, means including a phototube for applying to said output circuit an electrical potential proportional to the light passing from said lamp to said phototube, means for applying to said output circuit a second potential proportional to the current flowing in said lamp supply circuit and in voltage opposition to the potential applied by said first named means, an electrical indicating device, and means including a vacuum tube amplifier interposed between said output circuit and said indicator for actuating the latter in response to variations in the algebraic sum of the two opposed potentials applied to said output circuit.

RUSSELL L. SCHOENE.